May 26, 1959 J. A. LAUCK 2,887,907
HYDRAULIC DRILL PRESS
Filed June 17, 1955 2 Sheets-Sheet 1
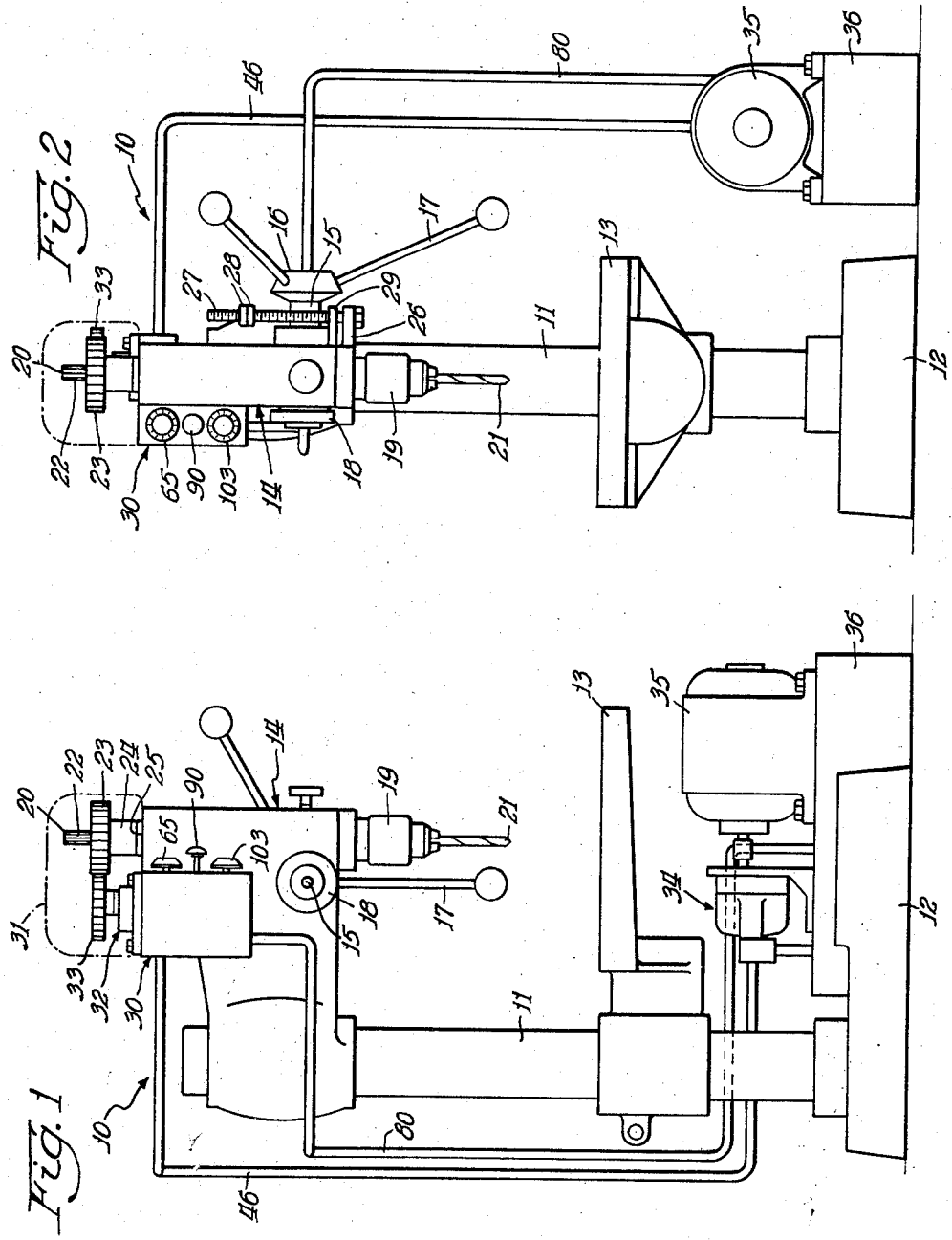
Inventor:
John A. Lauck
By: Joseph R Dwyer
Atty.

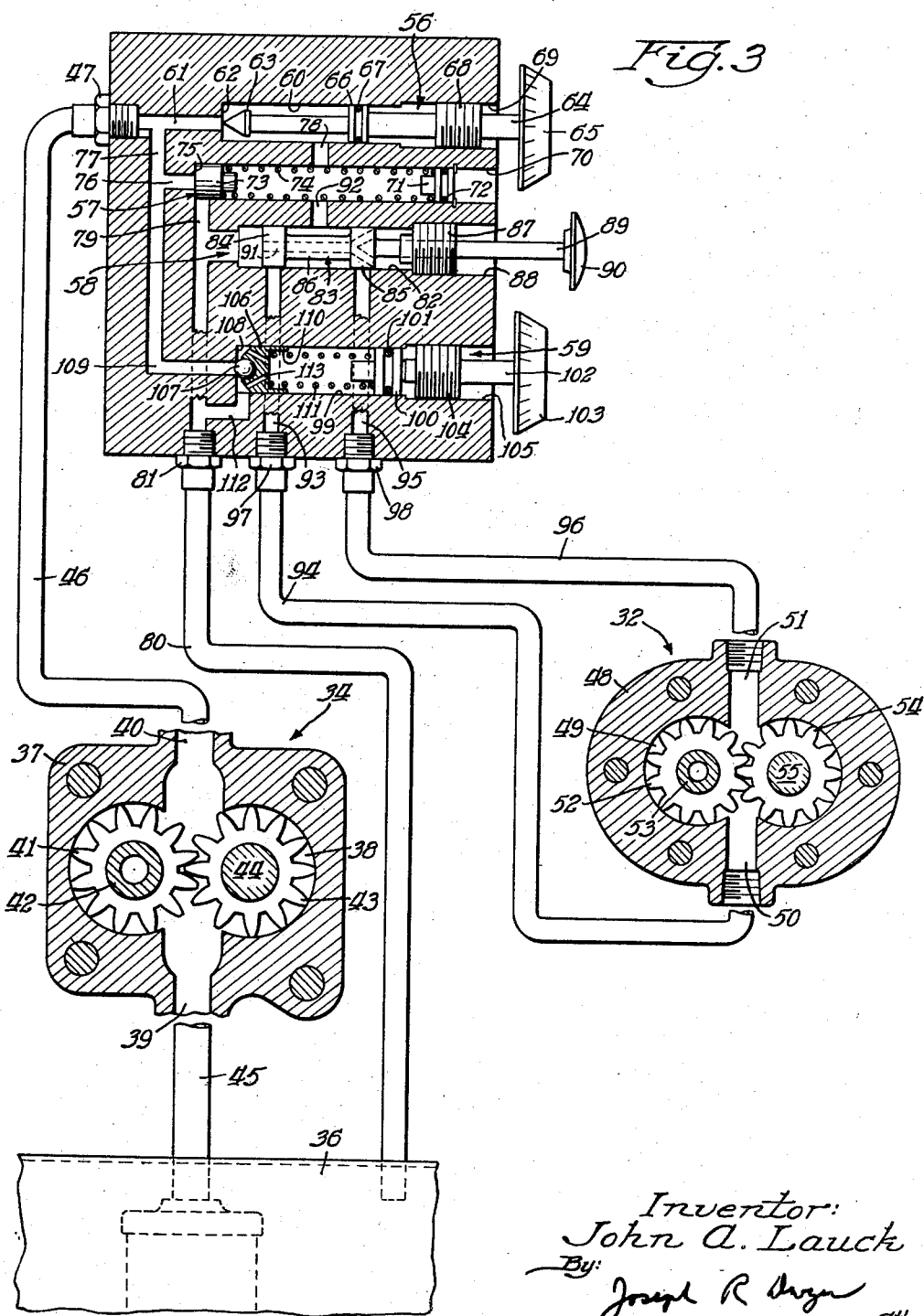

United States Patent Office 2,887,907
Patented May 26, 1959

2,887,907

HYDRAULIC DRILL PRESS

John A. Lauck, Shaker Heights, Ohio, assignor to Borg-Warner Corporation, Chicago, Ill., a corporation of Illinois Application June 17, 1955, Serial No. 516,097

17 Claims. (Cl. 77—5)

This invention relates to power tools and more particularly to a drill press.

In the usual drill press, power is supplied by a constant speed prime mover, generally an electric motor, and necessitates the use of a belt and pulleys or a gear box to deliver power to the drill. To vary the speed of a drill in this type of drill press requires that the drill press be stopped and the belt shifted to a different pulley, or requires the shifting of a gear shift lever, a very awkward and crude arrangement and as is obvious, the speed of the drill may only be varied in predetermined steps. Further, few of the present day drill presses of this type include an arrangement for reversing the direction of rotation of the drill necessary for backing off taps or drills in some types of work. The present invention effectively overcomes the disadvantages of the type of drill press above described by making it possible to continuously and infinitely vary the speed of the drill and to reverse the direction of rotation of the drill whenever necessary or desirable and without stopping the drill press. Therefore, it is the primary object of this invention to provide a drill press in which the drill speed may be continuously and infinitely varied and in which the direction of rotation of the drill may be reversed, without stopping the drill press.

The primary object of this invention is accomplished by providing a hydraulic motor for supplying power to the drill and control means for the motor which are few and simple, yet effective to accomplish the objects of this invention. Therefore, another object of this invention is to provide a drill press powered by hydraulic means having relatively few and simple controls for continuously and infinitely varying the drill speeds and changing the direction of rotation thereof, without stopping the drill press.

Also, in the usual drill press, the source of power must be relatively close to the drill press thereby requiring a large support and housing. The usual gear box and pulleys are generally mounted closely adjacent the source of power, so that the housing must also include the pulleys and gear boxes. The control means and the hydraulic motor employed in the present invention are relatively small and require a small support means and a housing. The source of hydraulic fluid may be far removed from the drill press and this source may be derived from means such as a pump driven by an electric motor or from a gasoline engine of an automotive vehicle, such as a tractor. Therefore, it is still another object of this invention to provide a drill press requiring a small support and housing for its driving means and allowing its source of power to be far removed therefrom.

Another drawback of the usual drill press is that it is impossible to control the torque of the drill which may result in the breaking of drills or taps. This invention overcomes this drawback by providing means in the form of an adjustable torque control valve to control the fluid pressure to the motor, and thereby the torque of the motor and drill. Therefore, still another object of this invention is to provide a drill press having adjustable torque control means to vary the torque output of the driving means and thereby of the drill.

These and other objects of the invention will become apparent from the following description when taken with the drawings in which:

Figure 1 is a side view of a drill press constructed in accordance with this invention;

Figure 2 is a front view of the drill press shown in Figure 1; and

Figure 3 is a diagrammatic showing of the hydraulic system and the control means of this invention.

In the various views, the same reference means is used to refer to the same part.

Attention is now directed to Figures 1 and 2 wherein there is illustrated a drill press, indicated in its entirety at 10, comprising a vertical column 11, mounted in a base 12, and having a work table 13 and a head, generally indicated at 14, adjustably mounted thereon. A rotatable shaft 15 extends horizontally through the head 14 and is provided at one end with a member 16 fixed thereto carrying a plurality of handles 17. A retaining member 18 is carried at the opposite end of the shaft 15. A chuck 19 is received on a vertically extending movable spindle 20 which passes through the head 14. The chuck 19 comprises the usual jawed chuck and receives a drill 21 within the jaws in the usual manner. The shaft 15 carries a pinion (not shown) which meshes with a rack (not shown) on the spindle 20, so that by moving the handles 17 and thereby rotating the shaft 15, spindle 20 is moved downwardly or upwardly and the drill 21 may be fed into or from the work received on the table 13.

The spindle 20 is splined as at 22 and receives a driven gear 23 having internal splines complementary to the splines 22 forming a driving connection therebetween. The gear 23 is provided with an axially extending bearing member 24 which bears on the adjacent bearing surface 25 of the head 14. Because of the splined driving connection between the gear 23 and the spindle 20, the spindle may be moved upwardly and downwardly relative to the gear while retaining the driving connection therebetween.

As in the usual drill press, means are provided for limiting the downward movement of the drill. This comprises a non-rotatable member 26 movable upwardly and downwardly with the spindle 20 and carrying a vertically extending screw threaded member 27. The screw threaded member receives an adjustable nut 28 and the head 14 is provided with an appendage 29 having an aperture therein through which the screw member 27 passes. When the nut 28 engages the appendage 29 the downward movement of the drill is stopped and further downward movement is prevented.

The head 14 has a control means, generally indicated at 30 mounted thereon, and carries housing 31 containing a hydraulic motor 32, the control means and motor to be later described. The motor 32 is provided with a pinion 33 which meshes with the gear 23 to drive the spindle 20, the chuck 19 and the drill 21.

Hydraulic fluid under pressure is supplied to the control means 30 and the motor 32 by means of a pump 34 driven, for example, as shown, by an electric motor 35 mounted on a reservoir or sump 36 forming a sump for the hydraulic system.

The pump 34 is of the usual intermeshing gear type and comprises a housing 37 having a pump chamber 38, an inlet 39 thereto and an outlet 40 therefrom. A driven gear 41 is received on a shaft 42 driven by a prime mover of any suitable type, for example, an electric motor 35, and an intermeshing driven gear 43 is received on a shaft 44. The pump 34 supplies fluid from the reservoir or sump 36 through a conduit 45 to a conduit 46 attached by means of a screw fitting 47 to the control means 30.

The hydraulic motor 32 comprises a housing 48, a chamber 49 in the housing and passages or ports 50 and 51 communicating with the chamber 49. A gear 52 is received on a shaft 53 connected to the pinion 33. An intermeshing gear 54 is received on a shaft 55. The motor is of the reversible type so that the passages 50 and 51 comprise either inlet or discharge passages or ports, depending upon the direction of flow of fluid to the motor.

Attention is now directed to Figure 3 for the details of the control means of this invention. Generally, the control means comprises an off-on speed control valve 56, a flow control valve 57, an open center forward-reverse valve 58 and a torque control relief valve 59.

The off-on speed control valve 56 comprises a bore 60 communicating at one end with a passage 61 connected to the high pressure fluid conduit 46. The passage 61 and the bore 60 form a shoulder 62, the purpose of which will become apparent. A needle valve member 63 of a smaller diameter than the bore 60 is received in the bore 60 and is carried by a stem 64 extending exteriorly of the bore 60 and having a graduated knob member 65 thereon. A plug member 66 is fixed to the stem member 64 and is provided with an O-ring seal 67, so that fluid is unable to leak therearound. Also carried by and fixed to the stem 64 is a screw threaded plug member 68, the screw threads of which cooperate with complementary screw threads 69 formed in the bore 60. By turning the knob 65 the needle valve member is movable into or out of engagement with the shoulder 62, so that high pressure fluid from the pump will enter or be excluded from the bore 60, and, this movement effectively controls the starting and stopping of the drill press. The particular position of the needle valve member 63 controls the amount of fluid passing therearound and thereby effectively controls the speed of the motor 32. The knob 65 carries graduations (not shown) which cooperate with an index point (not shown) on the valve housing, so that a particular setting of the valve 56 for a particular type of work may be recorded and the setting made at a later time.

The flow control valve 57 comprises a bore 70 closed at one end by a plug member 71 provided with an O-ring seal 72, and having a slidable valve member 73 disposed at the other end. A coil spring 74 is disposed between the plug member 71 and the slidable valve member 73 to urge the valve member into engagement with a shoulder 75 at the juncture of the bore 70 and a passage 76 communicating, by means of a passage 77, with the high pressure passage 61. The bore 70 is in communication with the bore 60 of the valve 56 by means of a passage 78. The pressure existing in the passage 76 acting against the piston 73 is counterbalanced by the pressure of the fluid within the bore 70 and the force of the spring 74 acting against the piston 73. A passage 79 communicates with the bore 70 and with a conduit 80 communicating with the sump 36. The conduit 80 is connected to the passage 79 by means of the usual screw fitting 81. The passage 79 is closed by means of the piston 73 until the pressure in the passage 76 is slightly greater than that in the bore 70, this condition usually occurring during the operation of the drill press and results in a slight opening up of the passage 79, that is, a movement of the piston 73, to control the flow of fluid to the motor. Therefore, it can be seen that the flow control valve 57 tends to maintain a predetermined pressure drop across the off-on speed control valve 56 by dividing the flow of fluid from the pump discharge 46 between the passages 61 and 76 when the off-on valve 56 is in a selected opened position. In this manner the flow control valve 57 tends to maintain the speed of rotation of the shaft 55 constant regardless of the load thereon by changing the ratio of the amount of fluid passing through the off-on valve 56 with respect to the amount of fluid passing through the flow control valve 57 when the load changes. When the pressure in the passage 76 is much greater than that in the bore 70, as when the needle valve 63 is closed (abutting the shoulder 62), the piston 73 quickly moves to the right, as viewed in Figure 3, dropping the pressure immediately and returning the high pressure fluid to the sump.

The open center forward-reverse valve 58 comprises a bore 82 slidably receiving a piston, of the open center variety generally indicated at 83, having spaced lands 84 and 85 separated by a groove 86. One end of the bore 82 communicates with the passage 79 and thereby with the sump 36, while the other end of the bore is closed by means of a screw-threaded packing member 87, the threads of which cooperate with complementary threads 88 in the bore 82. A stem member 89, which passes through the packing member 87, is attached to the piston 83 and carries a knob 90 at one end for moving the valve within the bore 82. The piston member 83 is formed with passage defining means 91 throughout its extent to provide communication between the opposite ends thereof for a purpose to be described. The bore 82 communicates with the bore 70 of the valve 57 by means of a passage 92 and also communicates by means of a passage 93 with a conduit 94 leading to the motor port 50 and a passage 95 communicating with a conduit 96 leading to the motor port 51. The conduits 94 and 96 are attached to the passages 93 and 95 by means of screw fittings 97 and 98, respectively.

When the forward-reverse valve is in its position shown in Figure 3, no controlled fluid pressure flows to the motor 32. Assuming that the knob 90 is pushed toward the control means 30, that is, to the left as shown in Figure 3, the passage 93 will be placed in communication with the controlled flow of fluid by means of the groove 86, so that controlled fluid will flow through the passage 93, the conduit 94, to the port 50 of the motor 32. Such flow of fluid will cause the gears of the motor 32 to be rotated and thereby provide a drive for the drill 21. In this case, the port 50 functions as an inlet port for the motor 32 and the port 51 functions as an outlet port thereof. The fluid passing through the port 51 is returned to the sump 36 by means of the conduit 96, the passage 95, the passage defining means 91 in the valve means 83, the passage 79 and the conduit 80.

To reverse the direction of rotation of the drill, it is only necessary to move the valve piston 84 in the opposite direction, that is, to the right as viewed in Figure 3. In this case, the motor port 51 functions as an inlet port and the port 50 functions as an outlet port. Fluid will thus flow to the port 51 by means of the groove 86, the passage 95, the conduit 96 to drive the pump gears in the opposite direction. Fluid discharged from the motor port 50 will flow through the conduit 94, the passage 93, the bore 82, the passage 79, the conduit 80 to the sump 36. With the valve piston in this position, the passage defining means 91 in the piston 84 serve to relieve fluid which may be trapped in the bore 82 on the right hand side of the piston 83.

The torque control valve 59 comprises a bore 99 receiving a plug member 100 provided with an O-ring seal 101 carried by a stem 102 provided with a knob 103. The stem 102 also carries a screw threaded plug member 104, the screw threads of which cooperate with a complementary screw threaded portion 105 of the bore 99. At the opposite end of the bore 99, there is disposed a slidable piston member 106 retaining a ball 107 seating against a shoulder 108 formed at the juncture of the bore 99 and a passage 109 communicating with the high pressure passage 61 by means of the passage 77. The valve member 106 is formed with a hollow space 110 opposite to the ball 107 and a coil spring 111 is received in the hollow space and between the piston 106 and the plug 100. A passage 112 communicates with the bore 99 closely adjacent the shoulder 108 at one end and with the passage 79 at its opposite end. Also, the piston 106 is formed with passages 113 therethrough, so that any fluid which may be trapped between the piston 106 and the plug 100 may be returned to the sump. By turning the knob 103 the position of the plug members 100 and 104 may be varied and also the loading of the spring 111 may be increased or decreased. The knob member 103 is graduated to co-operate with an index (not shown) formed on the valve means 30, so that the setting of this valve may be determined for any particular work and the setting later made when necessary.

By changing the force on the piston member 106 the pressure of the fluid by which the motor 32 operates may be effectively controlled. For example, if the loading of the spring 111 is decreased, fluid in the passage 109 will act against the valve 106 and move it to the right as viewed in Figure 3, and exhaust to the sump, thereby reducing the pressure entering the hydraulic motor through the valves 56 and 57. Such reduction in pressure reduces the torque output of the fluid motor 32. If the loading of the spring 111 is increased, a greater force will be exerted on the valve piston 106 by movement of the plugs 100 and 104 toward the piston 106, a greater pressure will be required to move the piston 106 against the spring 111, so that a greater fluid pressure will be supplied to the motor and the torque output of the motor 32 will be increased.

Therefore, there has been described a drill press driven by hydraulic power and incorporating features providing an infinitely variable speed, a reversal of direction of rotation and means for controlling the torque output of the motor, these features being controllable at the will of the operator with no stopping of the drill press.

Where herein the various parts of the drill press of this invention have been referred to as being located in a right or a left position, it will be understood that this is done solely for the purpose of facilitating description and that the references relate only to the relative positions of the parts as shown in the accompanying drawings.

While I have described my invention in connection with one specific embodiment thereof, it is to be understood that this is by way of illustration and not by way of limitation and the scope of my invention is defined solely by the appended claims.

I claim:

1. In a power tool machine, the combination of a rotary shaft, a fluid operated means for rotating said shaft, means for selectively varying the speed of rotation of said shaft to any speed within predetermined limits, means for tending to maintain a constant speed of rotation of said shaft for each setting of said means for selectively varying the speed of rotation of said shaft regardless of the load on said shaft, and means for selectively varying the torque output of said fluid operated means to any torque output within predetermined limits and thereby the torque of said shaft.

2. In a power tool machine, the combination of a rotary shaft, a fluid operated means for rotating said shaft, means for selectively changing the direction of rotation of said shaft, means for selectively varying the speed of rotation of said shaft to any speed within predetermined limits, means for tending to maintain a constant speed of rotation of said shaft for each setting of said means for selectively varying the speed of rotation of said shaft regardless of the load on said shaft, and means for selectively varying the torque output of said fluid operated means to any torque output within predetermined limits and thereby the torque of said shaft.

3. In a power tool machine, the combination of a rotary shaft, a fluid operated intermeshing gear motor for rotating said shaft in a forward and a reverse direction, means for supplying fluid under pressure to said motor for driving said motor and thereby for rotating said shaft, valve means for changing the direction of flow of said fluid under pressure to said motor to selectively change the direction of rotation of said shaft, valve means for selectively regulating the amount of fluid supplied to said motor to any amount of fluid within predetermined limits for varying the speed of rotation of said shaft, said valve means comprising an infinitely adjustable needle valve member adapted when in one position to prevent the flow of fluid under pressure to said motor, and means for tending to maintain a predetermined pressure drop across said needle valve member whereby the speed of rotation of said shaft remains constant for each setting of said needle valve member regardless of the load on said shaft.

4. In a power tool machine, the combination of a rotary shaft, a fluid operated motor for driving said shaft, a low pressure source of fluid, a pump for supplying fluid under pressure from said lower pressure fluid to said driving means, valve means for selectively regulating the fluid pressure supplied to said motor to any pressure within predetermined limits for varying the torque output of said motor and thereby the torque of said shaft, means for selectively varying the speed of rotation of said shaft, and means for tending to maintain a constant speed of rotation of said shaft for each setting of said means for selectively varying the speed of rotation of said shaft regardless of the load on said shaft.

5. In a power tool machine, the combination of a rotary shaft, a fluid operated motor for driving said shaft, a low pressure source of fluid, an intermeshing gear pump for supplying fluid under pressure from said source to said motor, adjustable valve means for selectively regulating the fluid pressure supplied to said motor to any pressure within predetermined limits for varying the torque output of said motor and thereby the torque of said shaft, means for selectively regulating the amount of fluid supplied to said motor to any amount of fluid within predetermined limits for varying the speed of rotation of said shaft and comprising an adjustable needle valve means when in one position preventing a flow of fluid under pressure to said motor for stopping the rotation of said shaft and thereby functioning as an on-off valve, and means for tending to maintain a predetermined pressure drop across said needle valve means whereby the speed of rotatation of said shaft remains constant for each setting of said needle valve means regardless of the load on said shaft.

6. In a power tool machine, the combination of a rotary shaft, a fluid operated motor for rotating said shaft in a forward and a reverse direction, means for selectively changing the direction of rotation of said shaft, means for selectively varying the torque output of said driving means to any torque output within predetermined limits and thereby the torque of said shaft, means for selectively varying the speed of rotation of said shaft, and means for tending to maintain a constant speed of rotation of said shaft for each setting of said means for selectively varying the speed of rotation of said shaft regardless of the load on said shaft.

7. In a power tool machine, the combination of a rotary shaft, a fluid operated motor for rotating said shaft in a forward and a reverse direction, a low pressure source of fluid, pump means for supplying fluid under pressure from said source to said motor for driving said motor and thereby for rotating said shaft, means for selectively regulating the amount of fluid supplied to said motor to any amount of fluid within predetermined limits for varying the speed of rotation of said shaft, means for tending to maintain a predetermined pressure drop between said pump means and said motor whereby the speed of rotation of said shaft remains constant for each setting of said means for varying the speed of rotation of said shaft regardless of the load on said shaft, means for selectively regulating the fluid pressure supplied to said motor to any pressure within predetermined limits for varying the torque output of said motor and thereby the torque of said shaft, and means for changing the direction of flow of said fluid under pressure to said motor to selectively change the direction of rotation of said shaft.

8. In a power tool machine, the combination of a rotary shaft, a fluid operated motor for rotating said shaft in a forward and a reverse direction, a low pressure source of fluid, pump means for supplying fluid under pressure from said source to said motor for driving said motor and thereby for rotating said shaft, means for selectively regulating the amount of fluid supplied to said motor to any amount of fluid within predetermined limits for varying the speed of rotation of said shaft, means for tending to maintain a predetermined pressure drop between said pump means and said motor whereby the speed of rotation of said shaft remains constant for each setting of said means for varying the speed of rotation of said shaft regardless of the load on said shaft, means for selectively regulating the fluid pressure supplied to said motor to any fluid pressure within predetermined limits for varying the torque output of said motor and thereby the torque of said shaft, and means to control the flow of fluid under pressure to said motor.

9. In a drill press which includes a base, a vertical column mounted in said base and supporting a vertically adjustable work table and a head, and a vertically movable chuck adapted to support a drill, the combination of a rotary drive shaft, an axially movable splined rotary driven shaft mounted in said head and supporting said chuck, means for providing a driving connection between said shafts comprising a gear fixed to said drive shaft and an intermeshing gear splined for relative movement to said driven shaft, a fluid motor for rotating said drive shaft and thereby said driven shaft, an intermeshing gear pump for supplying fluid to said motor, valve means for selectively regulating the amount of fluid supplied to said motor to any amount of fluid within predetermined limits for varying the speed of rotation of said driven shaft, and means for tending to maintain a predetermined pressure drop across said valve means whereby the speed of rotation of said shaft remains constant for each setting of said valve means regardless of the load on said shaft.

10. In a drill press as recited in claim 9, wherein said valve means comprises an infinitely adjustable needle valve means and movable to one position to prevent the flow of fluid under pressure to said motor.

11. In a drill press which includes a base, a vertical column mounted in said base and supporting a vertically adjusted work table and a head, and a vertically movable chuck adapted to support a drill, the combination of a rotary drive shaft, an axially movable splined rotary driven shaft mounted in said head and supporting said chuck, means providing a driving connection between said shafts comprising a gear fixed to said drive shaft and an intermeshing gear splined for relative movement to said driven shaft, a fluid motor for rotating said drive shaft and thereby said driven shaft, said motor comprising a housing, a chamber in said housing, a pair of oppositely disposed ports leading to and from said chamber, and a pair of intermeshing gears in said chamber one of which is connected to said drive shaft, said motor being reversible so that said driven shaft may be rotated in a forward and a reverse direction, a low pressure source of fluid, pump means for supplying fluid under pressure from said low pressure source to said chamber to drive said motor and thereby to rotate said shafts, means to selectively change the direction of rotation of said shafts comprising slidable valve means positioned between said pump means and said motor and slidable from one position for allowing a flow of fluid under pressure to said chamber through one of said pair of ports to rotate said driven shaft in said forward direction to another position to allow a flow of fluid under pressure to said chamber through the other of said pair of ports to rotate said driven shaft in said reverse direction, adjustable valve means for selectively regulating the fluid pressure supplied to said motor to any pressure within predetermined limits to vary the torque output of said motor and thereby the torque of said driven shafts, valve means for selectively regulating the amount of fluid supplied to said motor to any amount of fluid within predetermined limits for varying the speed of rotation of said motor and therefore the speed of rotation of said driven shaft, and means for tending to maintain a predetermined pressure drop across said valve means for varying the speed of rotation of said shaft whereby the speed of said shaft remains constant for each setting of said means for regulating the amount of high pressure fluid regardless of the load on said shaft.

12. In a drill press as recited in claim 11, wherein said slidable valve means comprises a piston having a pair of spaced lands separated by a groove.

13. In a drill press as recited in claim 12, wherein said adjustable valve comprises a piston, a ball supported by said piston, a coil spring resiliently acting on said piston, and means for infinitely varying the loading of said coil spring.

14. In a drill press as recited in claim 11, wherein said valve means for regulating the amount of fluid supplied to said motor comprises adjustable needle valve means movable to one position to prevent the flow of fluid under pressure to said motor.

15. In a drill press as recited in claim 11, wherein there is provided a valve means for controlling the flow of fluid to said motor.

16. A hydraulic control system for controlling the operation of a power tool machine comprising a source of high pressure fluid, means to regulate the amount of high pressure fluid supplied by said system to any amount of high pressure fluid within predetermined limits for tending to maintain a predetermined pressure drop across said means to regulate the amount of high pressure fluid supplied by said system, means to change the direction of flow of said high pressure fluid supplied by said system, and means to regulate selectively the pressure of said high pressure fluid supplied by said system to any pressure within predetermined limits.

17. A hydraulic control system for controlling the operation of a power tool machine which includes a hydraulically driven reversible motor comprising a source of high pressure fluid, adjustable means for selectively regulating the amount of high pressure fluid supplied to said motor to any amount of high pressure fluid within predetermined limits, means for tending to maintain a predetermined pressure drop between said source and said motor for each setting of said means for regulating the amount of high pressure fluid supplied to said motor regardless of the load on said motor means to change the direction of flow of said high pressure fluid to said motor to reverse the direction of rotation thereof, and adjustable means to regulate selectively the pressure of said high pressure fluid supplied to said motor to any pressure within predetermined limits.

References Cited in the file of this patent

UNITED STATES PATENTS

| 2,146,537 | Farnham | Feb. 7, 1939 |
| 2,419,792 | Poitras et al. | Apr. 29, 1947 |
| 2,582,556 | Morey | Jan. 15, 1952 |
| 2,796,793 | Addison et al. | June 25, 1957 |

FOREIGN PATENTS

| 198,473 | Great Britain | June 7, 1923 |

UNITED STATES PATENT OFFICE

CERTIFICATE OF CORRECTION

May 26, 1959

Patent No. 2,887,907

John A. Lauck

It is hereby certified that error appears in the printed specification of the above numbered patent requiring correction and that the said Letters Patent should read as corrected below.

Column 8, line 38, after "limits" insert -- means --.

Signed and sealed this 13th day of October 1959.

(SEAL)
Attest:

KARL H. AXLINE
Attesting Officer

ROBERT C. WATSON
Commissioner of Patents